United States Patent
Ngahu

(10) Patent No.: US 9,978,494 B2
(45) Date of Patent: May 22, 2018

(54) ELECTROMAGNETIC INDUCTION COIL

(71) Applicant: Yazaki Corporation, Tokyo (JP)

(72) Inventor: Antony Ngahu, Susono (JP)

(73) Assignee: Yazaki Corporation, Tokyo (JP)

( * ) Notice: Subject to any disclaimer, the term of this patent is extended or adjusted under 35 U.S.C. 154(b) by 41 days.

(21) Appl. No.: 14/825,357

(22) Filed: Aug. 13, 2015

(65) Prior Publication Data

US 2015/0348692 A1    Dec. 3, 2015

Related U.S. Application Data

(63) Continuation of application No. PCT/JP2014/053749, filed on Feb. 18, 2014.

(30) Foreign Application Priority Data

Feb. 19, 2013  (JP) .................................. 2013-029763

(51) Int. Cl.
| | | |
|---|---|---|
| *H01F 27/28* | (2006.01) | |
| *H01F 38/14* | (2006.01) | |
| *H01F 27/00* | (2006.01) | |
| *H02J 50/12* | (2016.01) | |

(52) U.S. Cl.
CPC ............ *H01F 27/006* (2013.01); *H01F 27/28* (2013.01); *H01F 38/14* (2013.01); *H02J 50/12* (2016.02)

(58) Field of Classification Search
CPC .................................................... H02J 50/12
See application file for complete search history.

(56) References Cited

U.S. PATENT DOCUMENTS

| | | | | |
|---|---|---|---|---|
| 4,980,663 | A * | 12/1990 | Moyer | .................... H01F 21/04 336/20 |
| 6,184,755 | B1 | 2/2001 | Barber et al. | |
| 7,525,283 | B2 * | 4/2009 | Cheng | ..................... H01F 38/14 320/108 |
| 7,825,543 | B2 | 11/2010 | Karalis et al. | |
| 8,378,524 | B2 | 2/2013 | Mita | |
| 2010/0052431 | A1 * | 3/2010 | Mita | ..................... B60L 11/182 307/104 |

(Continued)

FOREIGN PATENT DOCUMENTS

| | | |
|---|---|---|
| JP | 35-21062 Y | 8/1960 |
| JP | 61-149303 U | 9/1986 |

(Continued)

OTHER PUBLICATIONS

JP2012099644A, May 2012, Showa Aircraft.*

(Continued)

*Primary Examiner* — Elvin G Enad
*Assistant Examiner* — Malcolm Barnes
(74) *Attorney, Agent, or Firm* — Locke Lord LLP

(57) ABSTRACT

A primary electromagnetic induction coil, which supplies power to a primary resonance coil in a pair of a primary and a secondary resonance coils that conduct non-contact power supply by magnetic field resonance, includes a coil main body and a wedge that mounts an end portion of the coil main body to separate the end portion from other portions. Impedance matching can be achieved by adjusting a position of the wedge and a number of turns of the coil main body.

2 Claims, 9 Drawing Sheets

(56) References Cited

U.S. PATENT DOCUMENTS

| | | | | |
|---|---|---|---|---|
| 2010/0244583 A1* | 9/2010 | Shimokawa | ............. | H01Q 7/00 307/104 |
| 2011/0121920 A1* | 5/2011 | Kurs | ............. | H02J 17/00 333/219.2 |
| 2013/0093258 A1* | 4/2013 | Lee | ............. | H02J 5/005 307/104 |
| 2013/0270925 A1* | 10/2013 | Tanaka | ............. | H02J 50/12 307/104 |
| 2015/0357828 A1* | 12/2015 | Ichikawa | ............. | H01F 38/14 307/104 |

FOREIGN PATENT DOCUMENTS

| | | | | | |
|---|---|---|---|---|---|
| JP | 1986-149303 | U | | 9/1986 | |
| JP | S61149303 | U | * | 9/1986 | ............. H01C 3/20 |
| JP | 2-72522 | U | | 6/1990 | |
| JP | 1990-72522 | U | | 6/1990 | |
| JP | H0272522 | U | * | 6/1990 | ............. H01F 41/00 |
| JP | 2007-158360 | A | | 6/2007 | |
| JP | 2009-501510 | A | | 1/2009 | |
| JP | 2010-063245 | A | | 3/2010 | |
| JP | 2010-239777 | A | | 10/2010 | |
| JP | 2011-135717 | A | | 7/2011 | |
| JP | 2011135717 | A | * | 7/2011 | ............. H02J 17/00 |
| JP | 2012099644 | A | * | 5/2012 | ............. B60L 11/18 |

OTHER PUBLICATIONS

International Search Report dated Jun. 3, 2014, issued for PCT/JP2014/053749.
Office Action dated Aug. 11, 2016, issued for the Chinese patent application No. 201480009509.0 and English translation thereof.
Office Action dated Dec. 30, 2016 issued for corresponding German Patent Application No. 11 2014 000 885.0.
Office Action dated Jun. 15, 2017 issued for corresponding Japanese Patent Application No. 2013-029763.

* cited by examiner

ELECTROMAGNETIC INDUCTION COIL

TECHNICAL FIELD

The present invention relates to an electromagnetic induction coil. In particular, the present invention relates to an electromagnetic induction coil used in non-contact power supply of resonance type.

BACKGROUND OF THE INVENTION

In recent years, attention has been paid to wireless power supply, which does not use a power supply cord and a power transmission cable, as a power supply system that supplies power to a battery mounted on a hybrid automobile or an electric automobile. As one of techniques of the wireless power supply, a technique of resonance type is known.

As the power supply system of resonance type, for example, a supply system illustrated in FIG. 15 is proposed (Patent Literature 1). As illustrated in FIG. 15, a power supply system 100 includes a primary coil unit 102 and a secondary coil unit 103. The primary coil unit 102 is installed on the ground or the like of power supply facilities having an AC (alternating current) power supply 101, to supply power from the AC power supply 101 without contact. The secondary coil unit 103 is mounted on a vehicle to receive power from the primary coil unit 102 without contact.

The primary coil unit 102 includes a primary (power supply side) electromagnetic induction coil 104, a primary resonance coil 105, and a primary capacitor C1. The primary electromagnetic induction coil 104 is connected to the AC power supply 101. The primary resonance coil 105 is supplied with power from the primary electromagnetic induction coil 104 by electromagnetic induction. The primary capacitor C1 is connected to the primary resonance coil 105 to adjust a resonant frequency.

The secondary coil unit 103 includes a secondary (power receipt side) resonance coil 106, a secondary electromagnetic induction coil 107, and a secondary capacitor C2. The secondary resonance coil 106 conducts magnetic field resonance with the primary resonance coil 105. The secondary electromagnetic induction coil 107 is supplied with power from the secondary resonance coil 106 by electromagnetic induction and connected to a load 108. The secondary capacitor C2 is connected to the secondary resonance coil 106 to adjust the resonant frequency.

According to the above-described power supply system 100, when power from the AC power supply 101 is supplied to the primary electromagnetic induction coil 104, the power is sent to the primary resonance coil 105 by electromagnetic induction. As a result, magnetic field resonance is caused between the primary resonance coil 105 and the secondary resonance coil 106. Accordingly, wireless transmission of power from the primary resonance coil 105 to the secondary resonance coil 106 is conducted. In addition, the power sent to the secondary resonance coil 106 is sent to the secondary electromagnetic induction coil 107 by electromagnetic induction. The power is supplied to the load 108 connected to the secondary electromagnetic induction coil 107.

When the power supply system 100 is mounted on power supply facilities or a vehicle, however, a variation of a distance between the resonance coils 105 and 106 (hereafter abbreviated to "inter-coil distance") and position deviations of the resonance coils 105 and 106 occur. Occurrence of the distance variation and position deviations causes impedance mismatching. Consequently, power is reflected, resulting in lowered transmission efficiency.

This will now be described in more detail with reference to FIGS. 16 and 17. In the power supply system 100, impedance adjustment is conducted to make the transmission efficiency best when the inter-coil distance is 200 mm. FIG. 16 is a graph indicating frequency characteristics of an S parameter S21 between the resonance coils 105 and 106 in each of cases where the inter-coil distance is set equal to 100 mm, 200 mm, 300 mm and 400 mm in the power supply system 100 subjected to the impedance adjustment. In the power supply system 100, impedance adjustment is conducted to make the transmission efficiency best when the inter-coil distance is 200 mm. FIG. 17 is a graph indicating the transmission efficiency between the resonance coils 105 and 106 as a function of the inter-coil distance in the power supply system 100 subjected to the impedance adjustment.

If the inter-coil distance becomes larger than 200 mm in the conventional power supply system 100, coupling between the resonance coils 105 and 106 becomes weak accordingly and the S parameter S21 becomes low, resulting in lowered transmission efficiency as illustrated in FIG. 17. If the inter-coil distance becomes smaller than 200 mm, the coupling between the resonance coils 105 and 106 becomes too strong accordingly and bi-resonant characteristics are brought about as illustrated in FIG. 16. As a result, the S parameter S21 at a transmission frequency (a frequency of the AC power supply 101) becomes lower and the transmission efficiency is lowered.

As a countermeasure against the above-described inter-coil distance and position deviation, it is usually considered to provide a matching circuit in the primary coil unit 102 or the secondary coil unit 103 (or in both the primary coil unit 102 and the secondary coil unit 103 in some cases) to conduct impedance matching. A variable capacitor is provided in the matching circuit. Impedance matching can be executed by changing a capacitance.

In a case where the frequency of the transmission frequency is in a kHz region, however, a capacitor having a large capacitance is needed. It is inevitable to use a film capacitor or a ceramic capacitor. However, there is a problem that it is difficult to make the film capacitor or a ceramic capacitor variable.

CITATION LIST

Patent Literature

Patent Literature 1: JP 2009-501510A

SUMMARY OF THE INVENTION

Technical Problem

Therefore, it is an object of the present invention to provide an electromagnetic induction coil used in a power supply system capable of conducting impedance adjustment and maintaining high efficiency without relying upon a variable capacitor.

Solution to Problem

In order to attain the above object, according to a first aspect, a coil serving as at least one coil among one pair of resonance coils that conduct non-contact power supply by magnetic field resonance, an electromagnetic induction coil that supplies power to a power supply side of the pair of resonance coils, or an electromagnetic induction coil supplied with power from a power receipt side of the pair of resonance coils. The coil has a coil main body, and an adjustment mechanism configured to adjust a number of turns of the coil main body. The adjustment mechanism consists of a mounting portion to mount an end portion of the coil main body and separate the end portion from other portions.

Preferably, according to a second aspect, a coil serving as at least one coil among one pair of resonance coils that conduct non-contact power supply by magnetic field resonance, an electromagnetic induction coil that supplies power to a power supply side of the pair of resonance coils, or an electromagnetic induction coil supplied with power from a power receipt side of the pair of resonance coils. The coil has a coil main body, and an adjustment mechanism configured to adjust a number of turns of the coil main body. The adjustment mechanism consists of a turn back portion provided by winding back a portion of the coil main body.

Preferably, according to a third aspect, the mounting portion has an inclined plane that becomes higher as a position approaches the end portion of the coil main body, and the end portion of the coil main body is mounted on the inclined plane.

Preferably, according to a fourth aspect, the turn back portion is provided on the end portion of the coil main body.

Advantageous Effects of Invention

According to the present invention of the first aspect, impedance can be adjusted by adjusting the number of turns of the coil main body by means of the adjustment mechanism. As a result, impedance adjustment can be conducted without relying upon a variable capacitor. Consequently, non-conduct power supply can be conducted with high efficiency. Further, the impedance can be adjusted simply by moving the mounting portion.

According to the present invention of the second aspect, the impedance can be adjusted simply by adjusting the length of the turn back portion.

According to the present invention of the third aspect, the end portion of the coil main body can be separated from other portions gently. As a result, no load is applied on the coil main body.

According to the present invention of the fourth aspect, the turn back portion can be provided easily.

DESCRIPTION OF THE PREFERRED EMBODIMENT

First Embodiment

Figure 1:
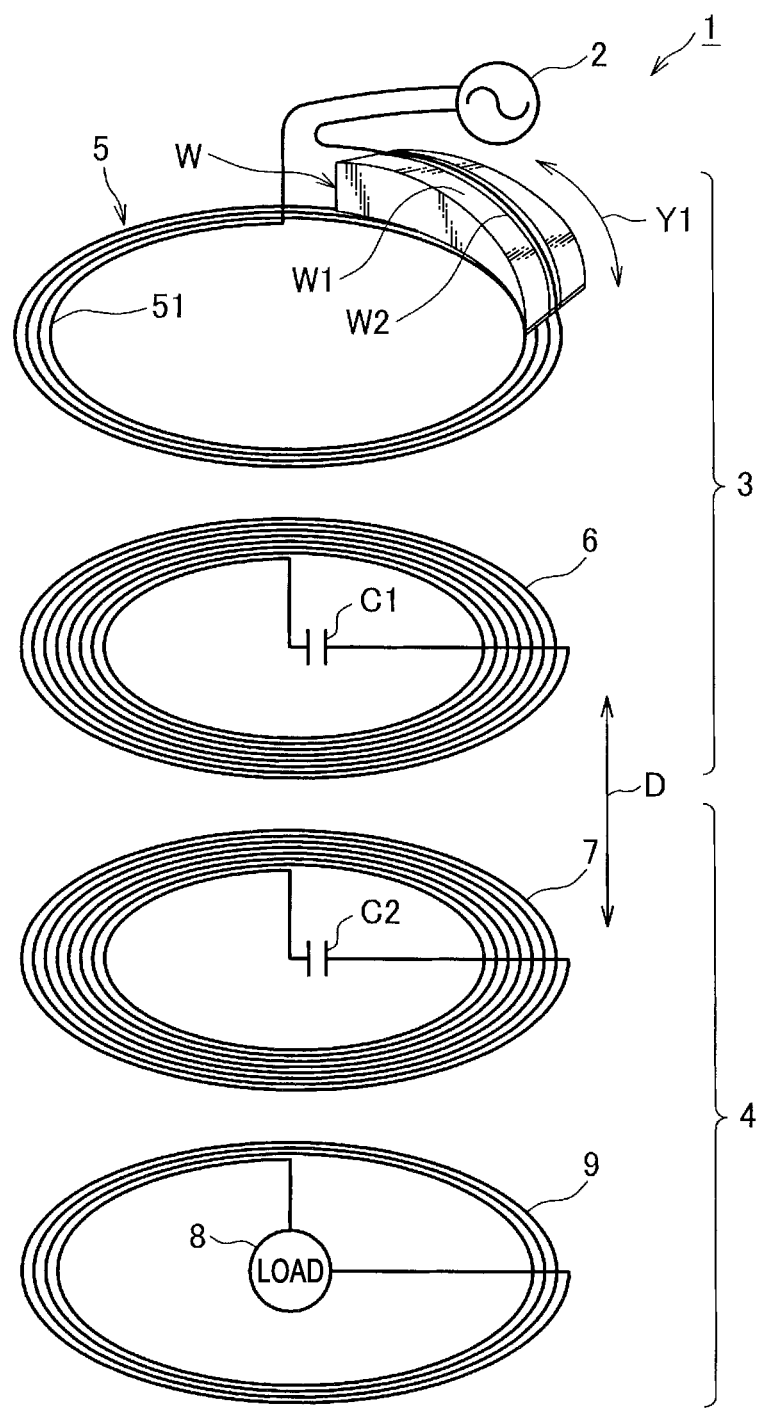
FIG. 1 is a diagram illustrating a power supply system incorporating an electromagnetic induction coil according to the present invention in a first embodiment.

Hereafter, a power supply system incorporating an electromagnetic induction coil according to the present invention in a first embodiment will be described with reference to FIG. 1. As illustrated in FIG. 1, a power supply system 1 includes a primary coil unit 3 and a secondary coil unit 4. The primary coil unit 3 is installed on the ground or the like of power supply facilities having an AC power supply 2, to supply power from the AC power supply 2 without contact. The secondary coil unit 4 is mounted on a vehicle to receive power from the primary coil unit 3 without contact.

The primary coil unit 3 includes a primary electromagnetic induction coil 5, a primary resonance coil 6, and a primary capacitor C1. The primary electromagnetic induction coil 5 is connected to the AC power supply 2. The primary resonance coil 6 is supplied with power from the primary electromagnetic induction coil 5 by electromagnetic induction. The primary capacitor C1 is connected to the primary resonance coil 6 to adjust the resonant frequency. The primary electromagnetic induction coil 5 corresponds to an electromagnetic induction coil and a coil in claims. The primary resonance coil 6 corresponds to a power supply side coil included in one pair of resonance coils in claims.

The secondary coil unit 4 includes a secondary resonance coil 7, a secondary electromagnetic induction coil 9, and a secondary capacitor C2. The secondary resonance coil 7 conducts magnetic field resonance with the primary resonance coil 6. The secondary electromagnetic induction coil 9 functions as an electromagnetic induction coil supplied with power from the secondary resonance coil 7 by electromagnetic induction and connected to a load 8. The secondary capacitor C2 is connected to the secondary resonance coil 7 to adjust the resonant frequency. The secondary electromagnetic induction coil 9 corresponds to an electromagnetic induction coil in claims. The secondary resonance coil 7 corresponds to a receipt side coil included in one pair of resonance coils in claims.

Each of the primary electromagnetic induction coil 5, the primary resonance coil 6, the secondary resonance coil 7, and the secondary electromagnetic induction coil 9 is wound in a spiral form on a holding member such as a substrate, which is not illustrated, and formed. The primary electromagnetic induction coil 5 and the primary resonance coil 6 are disposed on the same axis to be separated from each other. The primary electromagnetic induction coil 5 and the primary resonance coil 6 are disposed to have an axis direction along a direction in which the primary coil unit 3 and the secondary coil unit 4 are opposed to each other, i.e., along a vertical direction.

The secondary resonance coil 7 and the secondary electromagnetic induction coil 9 are also disposed on the same axis to be separated from each other, and disposed to have an axis direction along the vertical direction. When the primary coil unit 3 and the secondary coil unit 4 are opposed to each other, therefore, the primary electromagnetic induction coil 5, the primary resonance coil 6, the secondary resonance coil 7, and the secondary electromagnetic induction coil 9 are disposed on the same axis.

According to the above-described power supply system 1, when power from the AC power supply 2 is supplied to the primary electromagnetic induction coil 5, the power is sent to the primary resonance coil 6 by electromagnetic induction in the same way as the conventional system. As a result, magnetic field resonance is caused between the primary resonance coil 6 and the secondary resonance coil 7. Accordingly, wireless transmission of power from the primary resonance coil 6 to the secondary resonance coil 7 is conducted. In addition, the power sent to the secondary resonance coil 7 is sent to the secondary electromagnetic induction coil 9 by electromagnetic induction. The power is supplied to the load 8 connected to the secondary electromagnetic induction coil 9.

An example of the primary electromagnetic induction coil 5, which is a feature of the present invention, will now be described. The primary electromagnetic induction coil 5 includes a coil main body 51 and a wedge W functioning as an adjustment mechanism for adjusting a number of turns of the coil main body, which mount a first end portion (in the present embodiment, an outside end portion) of the coil main body 51 and separate the first end portion from other portions. The adjustment mechanism consists of a mounting portion. The coil main body 51 includes a wire material having flexibility. The coil main body 51 is disposed on a holding member such as a substrate, which is not illustrated, as above-described. The wire material having flexibility is wound in a circular-shaped spiral form.

The wedge W is mounted on a flat plate on which the coil main body 51 is disposed. The wedge W is provided in a nearly box form. The wedge W is provided in an elongated form along a winding direction Y1 of the coil main body 51. The wedge W is provided to curve along the winding direction Y1. An inclined plane W1 is provided on the wedge W. The inclined plane W1 becomes higher as the position approaches the first end portion of the coil main body 51. A line shaped accommodation groove W2 is provided on the inclined plane W1 to accommodate the first end portion of the coil main body 51. The first end portion of the coil main body 51 is accommodated in the line shaped accommodation groove W2.

The first end portion of the coil main body 51, which is a portion mounted on the wedge W, is separated from other portions in a height direction. Therefore, the portion of the coil main body 51 mounted on the wedge W does not contribute to the function exhibited as a coil. If the wedge W is moved to a side apart from the first end portion of the coil main body 51, the wedge W moves clockwise in FIG. 1. As a result, the length of an end portion of the coil main body 51 mounted on the wedge W increases and the number of turns of the coil main body 51 can be decreased.

On the other hand, if the wedge W is moved toward the first end portion of the coil main body 51, the wedge W moves counterclockwise in FIG. 1. As a result, the length of the end portion of the coil main body 51 mounted on the wedge W decreases and the number of turns of the coil main body 51 can be increased.

In some cases, an inter-coil distance D is large due to, for example, an installation environment of the primary coil unit 3 and the secondary coil unit 4. In this case, the wedge W is moved clockwise in FIG. 1 to decrease the number of turns of the coil main body 51, in the above-described power supply system 1. As a result, impedance matching can be achieved by decreasing the number of turns of the coil main body 51, i.e., an inductance L and a mutual inductance M. On the other hand, in a case where the inter-coil distance D is small, the number of turns of the coil main body 51 is increased by moving the wedge W counterclockwise in FIG. 1.

As a result, impedance matching can be achieved by increasing the number of turns of the coil main body 51, i.e., the inductance L and the mutual inductance M to eliminate the bi-resonant characteristics. As a result, it is possible to conduct impedance adjustment and conduct non-contact power supply with high efficiency without relying upon a variable capacitor. Furthermore, the impedance can be adjusted simply by moving the wedge W.

According to the above-described power supply system 1, the inclined plane W1, which becomes higher as the position approaches the first end portion of the coil main body 51, is provided on the wedge W, and the first end portion of the coil main body 51 is mounted on the inclined plane W1. As a result, the end portion of the coil main body 51 can be separated from other portions gently, and consequently no load is applied on the coil main body 51.

Figure 2:
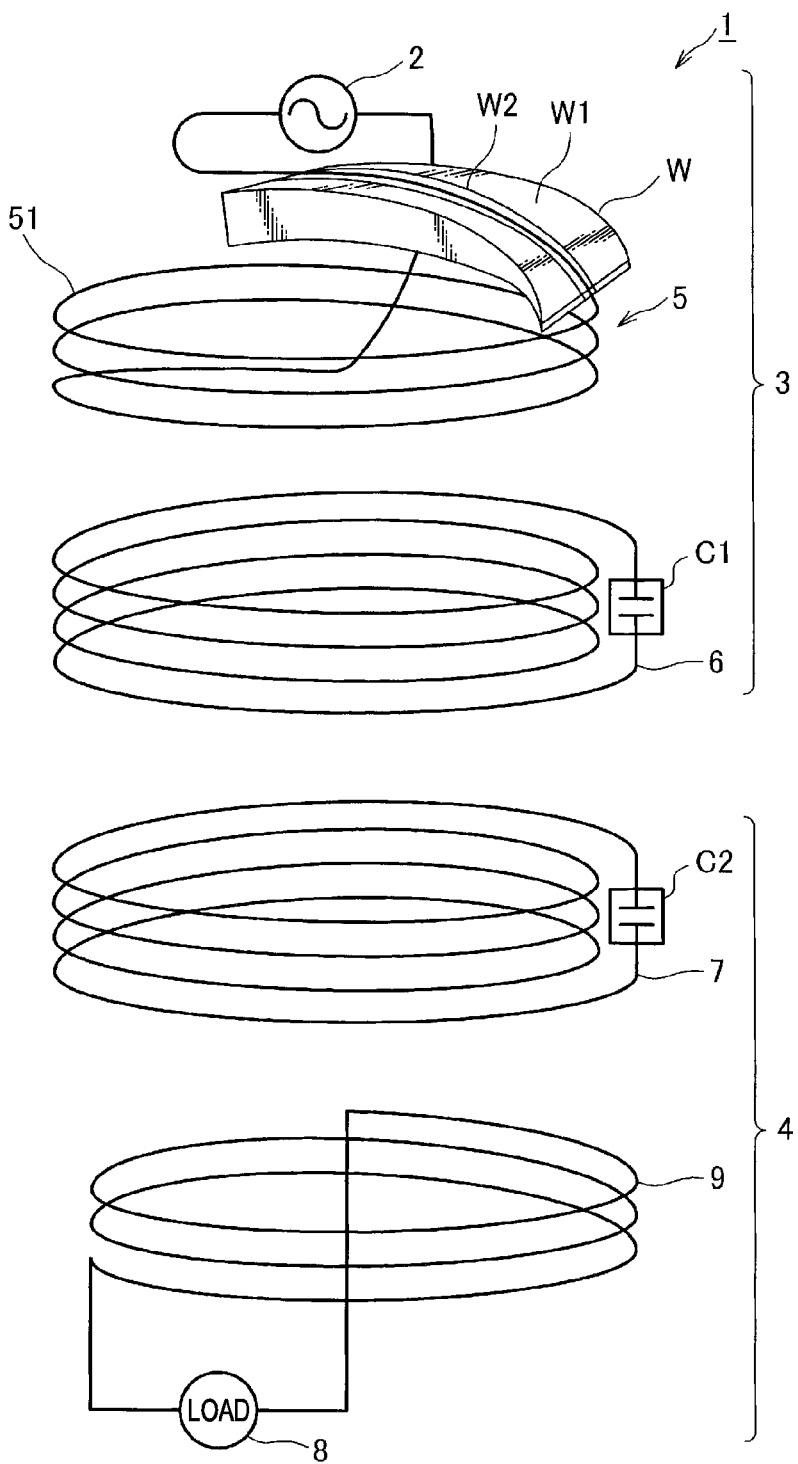
FIG. 2 is a diagram illustrating a modification of the power supply system in the first embodiment.

In the above-described first embodiment, the wedge W is provided in the primary electromagnetic induction coil 5 wound in the spiral form. However, the shape of a coil in which the wedge W can be provided is not restricted to this. The shape of the coil may be another well-known shape. For example, it is conceivable to provide the wedge W in the primary electromagnetic induction coil 5 wound in a helical form as illustrated in FIG. 2. The wedge W is mounted on a holding member (not illustrated), which holds the coil main body 51 of the primary electromagnetic induction coil 5, such as a bobbin in the same way as the first embodiment. In FIG. 2, the primary resonance coil 6, the secondary resonance coil 7, and the secondary electromagnetic induction coil 9 are also wound in a helical form and formed. In this case as well, effects similar to those in the first embodiment can be obtained.

In the above-described first embodiment and the modification illustrated in FIG. 2, only the first end portion of the coil main body 51 is mounted on the wedge W. However, the present invention is not restricted to this. Only a second end portion of the coil main body 51 may be mounted on the wedge W. Both end portions of the coil main body 51 may be mounted on the wedge W.

In the above-described first embodiment and the modification illustrated in FIG. 2, the wedge W is provided only in the primary electromagnetic induction coil 5. However, the present invention is not restricted to this. For example, the wedge W may be provided only in the secondary electromagnetic induction coil 9. The wedge W may be provided in both the primary electromagnetic induction coil 5 and the secondary electromagnetic induction coil 9.

In the above-described first embodiment and the modification illustrated in FIG. 2, each of the primary electromagnetic induction coil 5, the primary resonance coil 6, the secondary resonance coil 7, and the secondary electromagnetic induction coil 9 is provided to have an axis in the vertical direction. However, disposition of the coils is not restricted to this. For example, it is conceivable to dispose the coils as illustrated in FIG. 3.

Figure 3:
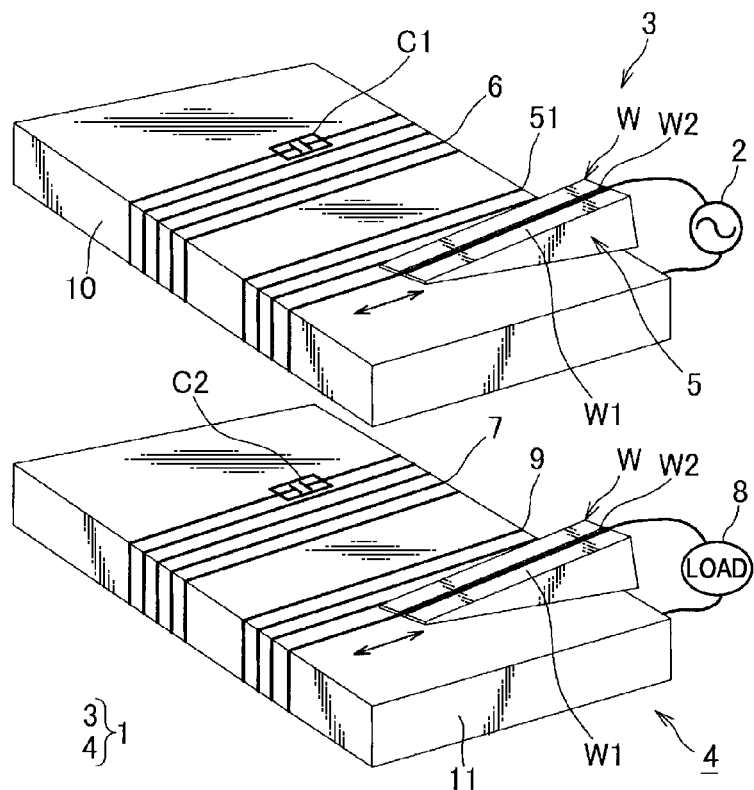
FIG. 3 is a diagram illustrating a modification of the power supply system in the first embodiment.

As illustrated in FIG. 3, the primary electromagnetic induction coil 5 and the primary resonance coil 6 are wound round a flat plate shaped primary core 10 in a helical form. As a result, the primary electromagnetic induction coil 5 and the primary resonance coil 6 are disposed on the same axis. The secondary resonance coil 7 and the secondary electromagnetic induction coil 9 are also wound round a flat plate shaped secondary core 11 in a helical form. As a result, the secondary resonance coil 7 and the secondary electromagnetic induction coil 9 are disposed on the same axis.

The primary core 10 and the secondary core 11 are disposed side by side to be parallel to each other. Therefore, an axis of each of the primary electromagnetic induction coil 5, the primary resonance coil 6, the secondary resonance coil 7, and the secondary electromagnetic induction coil 9 is disposed in a horizontal direction. The horizontal direction is a direction perpendicular to a direction in which the primary coil unit 3 and the secondary coil unit 4 are opposed to each other.

The above-described primary electromagnetic induction coil 5 includes a coil main body 51 and a wedge W in the same way as the first embodiment. The wedge W is mounted on the primary core 10, which is a holding member. The wedge W is provided in an elongated form along a winding direction of the coil main body 51. The wedge W is provided in a straight-line form along the winding direction. An inclined plane W1 is provided on the wedge W. The inclined plane W1 becomes higher as the position approaches a first end portion of the coil main body 51. A line shaped accommodation groove W2 is provided on the inclined plane W1 to accommodate the end portion of the coil main body 51. The end portion of the coil main body 51 is accommodated in the line shaped accommodation groove W2.

In the modification illustrated in FIG. 3, a wedge W is provided in the secondary electromagnetic induction coil 9 as well to mount a first end portion of a coil main body 91 and separate the first end portion from other portions. In the modification illustrated in FIG. 3 as well, impedance matching can be achieved by moving the wedge W in the same way as the first embodiment and changing the number of turns of each of the coil main bodies 51 and 91.

In the modification illustrated in FIG. 3, the wedges W are provided in both the primary electromagnetic induction coil 5 and the secondary electromagnetic induction coil 9. However, the present invention is not restricted to this. The wedge W may be provided only in the primary electromagnetic induction coil 5. Alternatively, the wedge W may be provided only in the secondary electromagnetic induction coil 9.

Figure 4:
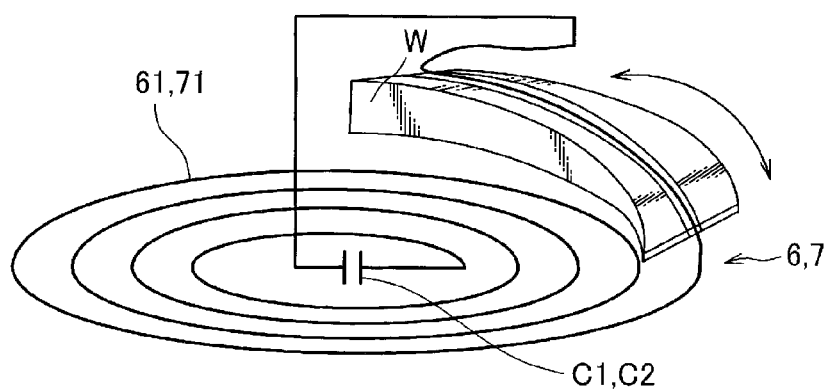
FIG. 4 is a diagram illustrating a modification of the power supply system in the first embodiment.
Figure 5:
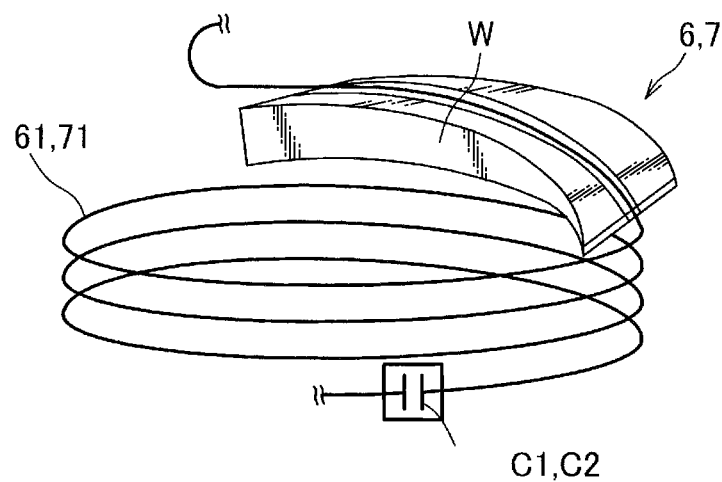
FIG. 5 is a diagram illustrating a modification of the power supply system in the first embodiment.
Figure 6:
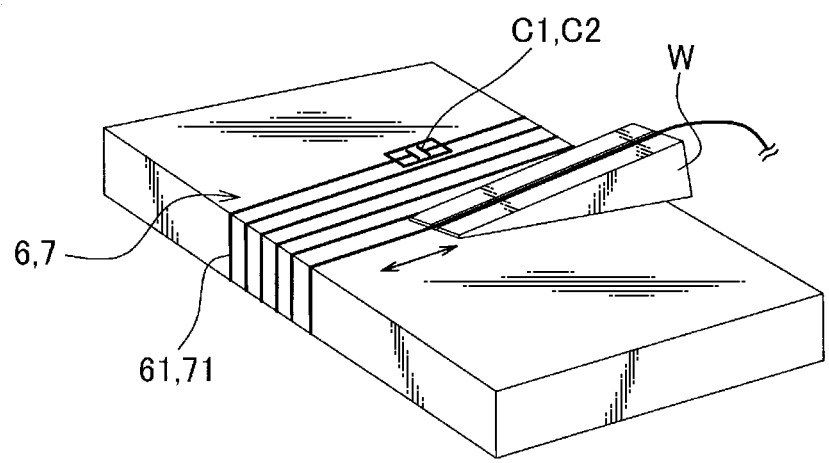
FIG. 6 is a diagram illustrating a modification of the power supply system in the first embodiment.

In the above-described first embodiment and the modifications thereof, each of the primary and secondary electromagnetic induction coils 5 and 9 is mounted on the wedge W. However, the present invention is not restricted to this. For example, as illustrated in FIG. 4, the resonance coils 6 and 7 may include coil main bodies 61 and 71, respectively and the wedges W. In the example illustrated in FIG. 4, the resonance coils 6 and 7 are formed in a spiral form. As illustrated in FIG. 5, however, the wedges W may be provided in helical resonance coils 6 and 7. As illustrated in FIG. 6, the wedges W may be provided in resonance coils 6 and 7 having axes disposed in the horizontal direction.

As a result, it is considered that the resonant frequency of the resonance coils 6 and 7 deviates due to not only the variation of the inter-coil distance D but also variations in manufacture of the resonance coils 6 and 7, the capacitors C1 and C2, ferrite and coil bobbins. However, it becomes possible to modify the resonant frequency by adjusting the position of the wedge W to adjust inductance of the resonance coils 6 and 7. As a result, impedance adjustment can be conducted.

In the wedge W in the above-described first embodiment and modifications thereof, the inclined plane W1 and the line shaped accommodation groove W2 are provided. However, the present invention is not restricted to this. The inclined plane W1 and the line shaped accommodation groove W2 may not be provided.

Second Embodiment

Figure 7:
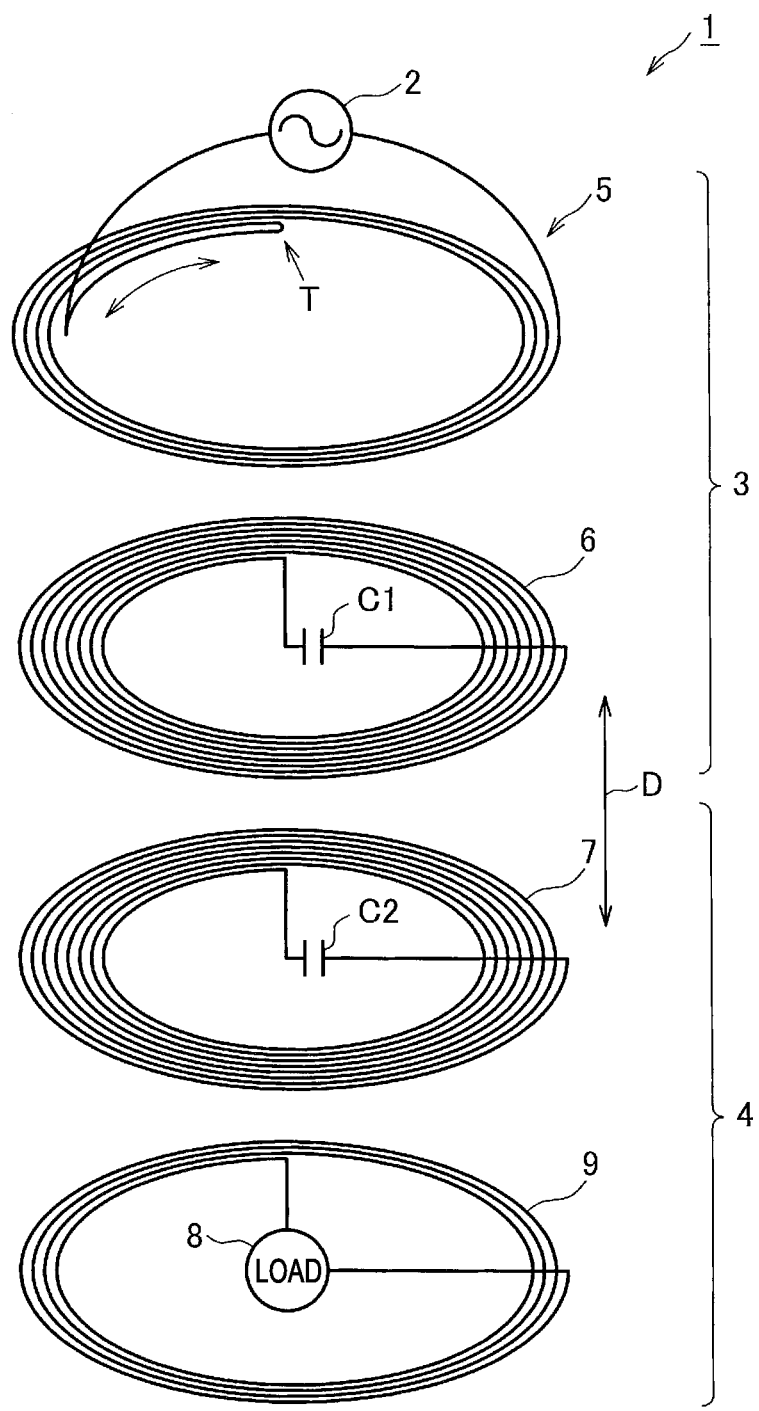
FIG. 7 is a diagram illustrating a power supply system incorporating an electromagnetic induction coil according to the present invention in a second embodiment.

A power supply system 1 incorporating an electromagnetic induction coil according to the present invention in a second embodiment will now be described with reference to FIG. 7. The second embodiment differs from the first embodiment in configuration of the adjustment mechanism. Other portions are similar to those in the first embodiment illustrated in FIG. 1. Therefore, detailed description of other portions will be omitted. In the first embodiment, the wedge W is provided as the adjustment mechanism. In the second embodiment, a turn back portion T provided by winding back a first end portion of a coil main body 51 becomes the adjustment mechanism.

In the turn back portion T, magnetic fluxes generated from a portion along a winding direction and a portion along a wind back direction, which are adjacent to each other, cancel each other. Therefore, the turn back portion does not contribute to the function exhibited as a coil. If the turn back portion T is made large, therefore, the number of turns of the coil main body 51 can be decreased. On the other hand, if the turn back portion T is made small, the number of turns of the coil main body 51 can be increased.

In some cases, an inter-coil distance D is large due to, for example, an installation environment of the primary coil unit 3 and the secondary coil unit 4. In this case, the turn back portion T is made large to decrease the number of turns of the coil main body 51, in the above-described power supply system 1. As a result, impedance matching can be achieved by decreasing the number of turns of the coil main body 51, i.e., an inductance L and a mutual inductance M. On the other hand, in a case where the inter-coil distance D is small, the number of turns of the coil main body 51 is increased by making the turn back portion T small. As a result, impedance matching can be achieved by increasing the number of turns of the coil main body 51, i.e., the inductance L and the mutual inductance M to eliminate the bi-resonant characteristics. As a result, it is possible to conduct impedance adjustment and conduct non-contact power supply with high efficiency without relying upon a variable capacitor. Furthermore, the impedance can be adjusted simply by adjusting the length of the turn back portion T.

According to the above-described power supply system 1, the turn back portion T can be provided easily by providing the turn back portion T in the end portion of the coil main body 51.

In the turn back portion T, magnetic fluxes generated from the portion along the winding direction and the portion along the wind back direction, which are adjacent to each other, cancel each other as described above. Therefore, the same effect can be obtained with a length that is equal to half of the mounting length of the wedge W.

Figure 8:
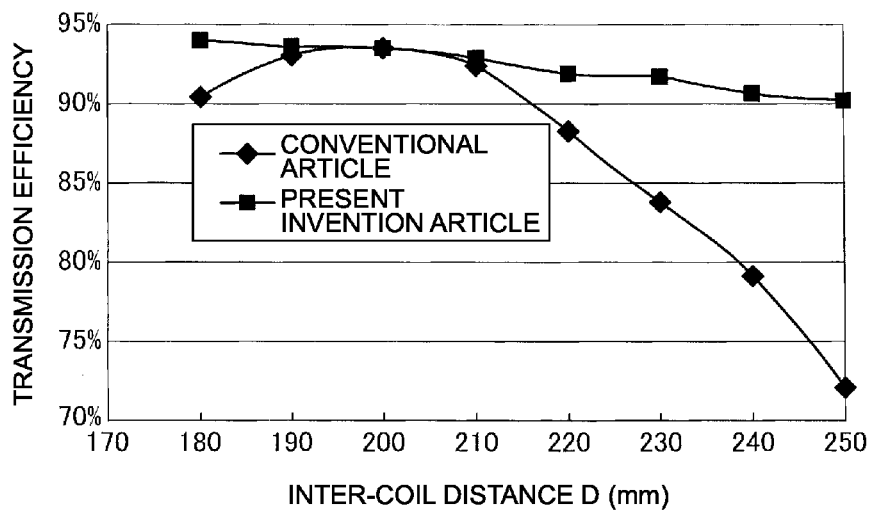
FIG. 8 is a graph illustrating results obtained by actually measuring the transmission efficiency as a function of the inter-coil distance with respect to a conventional article and a present invention article having a turn back portion.

The present inventor actually measured the transmission efficiency as a function of the inter-coil distance with respect to a conventional article, which is a conventional power supply system having no turn back portion T, and a present invention article, which is the power supply system 1 according to the present invention having the turn back portion T. Results are illustrated in FIG. 8. As for the present invention article, the highest transmission efficiency is plotted by adjusting the length of the turn back portion T.

As illustrated in FIG. 8, the transmission efficiency of at least 90% can be kept in the conventional article only when the inter-coil distance D is in the range of 180 mm to 210 mm. On the other hand, in the present invention article, transmission efficiency of at least 90% can be kept in a wide range of the inter-coil distance D of 180 mm to 250 mm.

Figure 9:
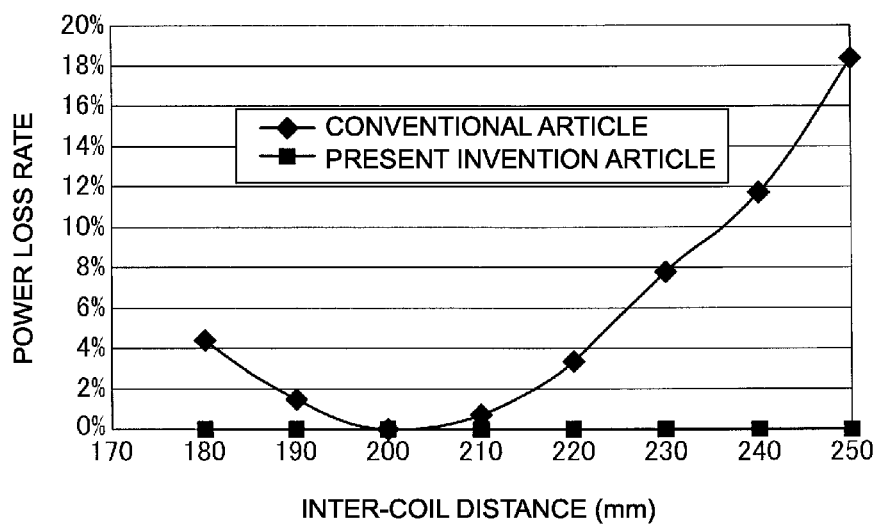
FIG. 9 is a graph illustrating results obtained by actually measuring the power loss rate as a function of the inter-coil distance with respect to a conventional article and a present invention article having the turn back portion.

The present inventor actually measured the power loss rate as a function of the inter-coil distance D with respect to the conventional article and the present invention article. Results are illustrated in FIG. 9. As for the present invention article, the lowest power loss rate is plotted by adjusting the length of the turn back portion T. As illustrated in FIG. 9, in the conventional article, the power loss rate becomes large as the inter-coil distance D is separated from 200 mm. On the other hand, in the present invention article, the power loss rate can be made equal to 0% in a wide range of the inter-coil distance D of 180 mm to 250 mm.

Figure 10:
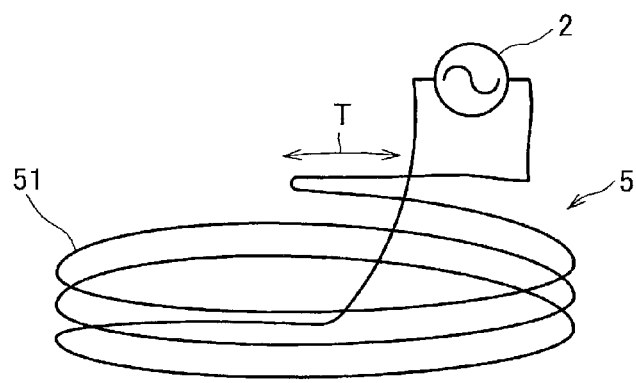
FIG. 10 is a diagram illustrating a modification of the power supply system in the second embodiment.

In the above-described second embodiment, the turn back portion T is provided in the primary electromagnetic induction coil 5 wound in the spiral form. However, the shape of a coil in which the turn back portion T can be provided is not restricted to this. The shape of the coil may be another well-known shape. For example, it is also conceivable to provide the turn back portion T in the primary electromagnetic induction coil 5 wound in a helical form as illustrated in FIG. 10. Since the primary resonance coil 6, the secondary resonance coil 7, and the secondary electromagnetic induction coil 9 are similar to those in FIG. 2, they are omitted from FIG. 10.

Figure 11:
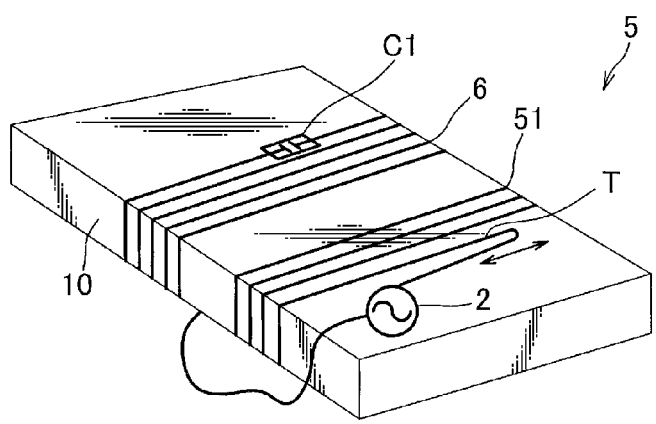
FIG. 11 is a diagram illustrating a modification of the power supply system in the second embodiment.

In the above-described second embodiment and the modification illustrated in FIG. 10, each of the primary electromagnetic induction coil 5, the primary resonance coil 6, the secondary resonance coil 7, and the secondary electromagnetic induction coil 9 is provided to have an axis in the vertical direction. However, disposition of the coils is not restricted to this. For example, it is also conceivable to provide the turn back portion T in the primary electromagnetic induction coil 5 that is wound round the primary core 10 in a helical form coaxially with the primary resonance coil 6 and that has an axis direction along the horizontal direction as illustrated in FIG. 11. Since the secondary resonance coil 7 and the secondary electromagnetic induction coil 9 are similar to those in FIG. 3, they are omitted from FIG. 11.

In the above-described second embodiment, the turn back portion T is provided on the first end of the coil main body 51. However, the present invention is not restricted to this. The turn back portion T may be provided on a second end of the coil main body 51. The turn back portion T may be provided on both ends of the coil main body 51. The turn back portion T is not restricted to end portions. For example, it is also conceivable to provide the turn back portion T in a central portion of the coil main body 51.

In the above-described second embodiment, the turn back portion T is provided only in the primary electromagnetic induction coil 5. However, the present invention is not restricted to this. The turn back portion T may be provided only in the secondary electromagnetic induction coil 9. It is also conceivable to provide the turn back portion T in both the primary electromagnetic induction coil 5 and the secondary electromagnetic induction coil 9.

In the above-described first and second embodiments, each of the coil main bodies 51 and 91 has a plurality of turns (at least two turns). However, each of the coil main bodies 51 and 91 may have one turn.

Figure 12:
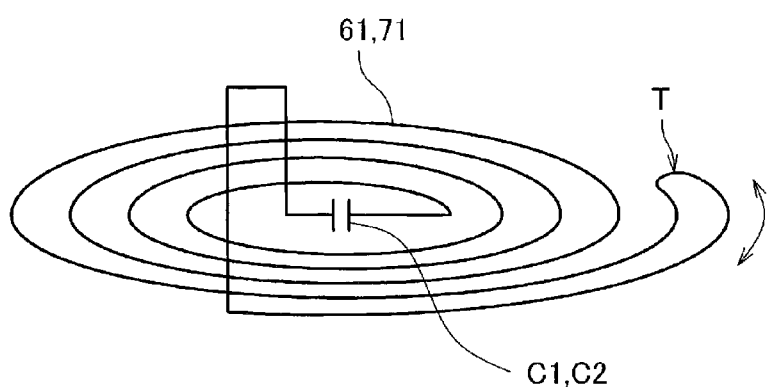
FIG. 12 is a diagram illustrating a modification of the power supply system in the second embodiment.
Figure 13:
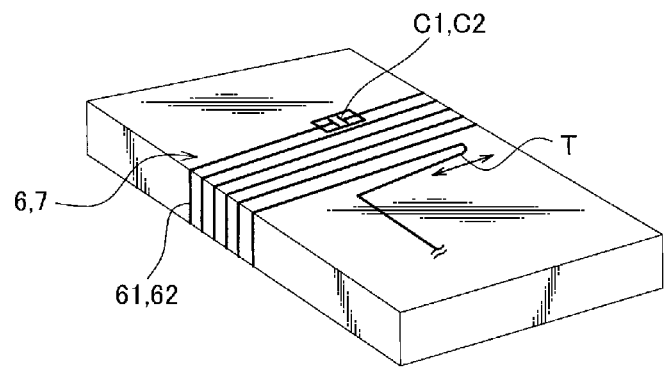
FIG. 13 is a diagram illustrating a modification of the power supply system in the second embodiment.
Figure 14:
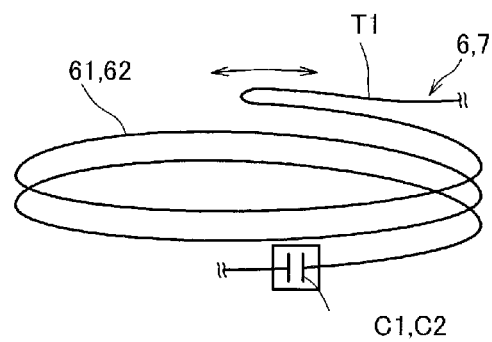
FIG. 14 is a diagram illustrating a modification of the power supply system in the second embodiment.
Figure 15:
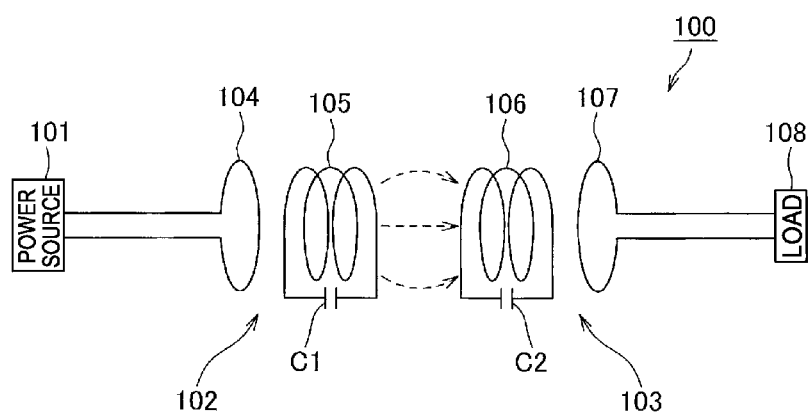
FIG. 15 is a diagram illustrating an example of a conventional power supply system.
Figure 16:
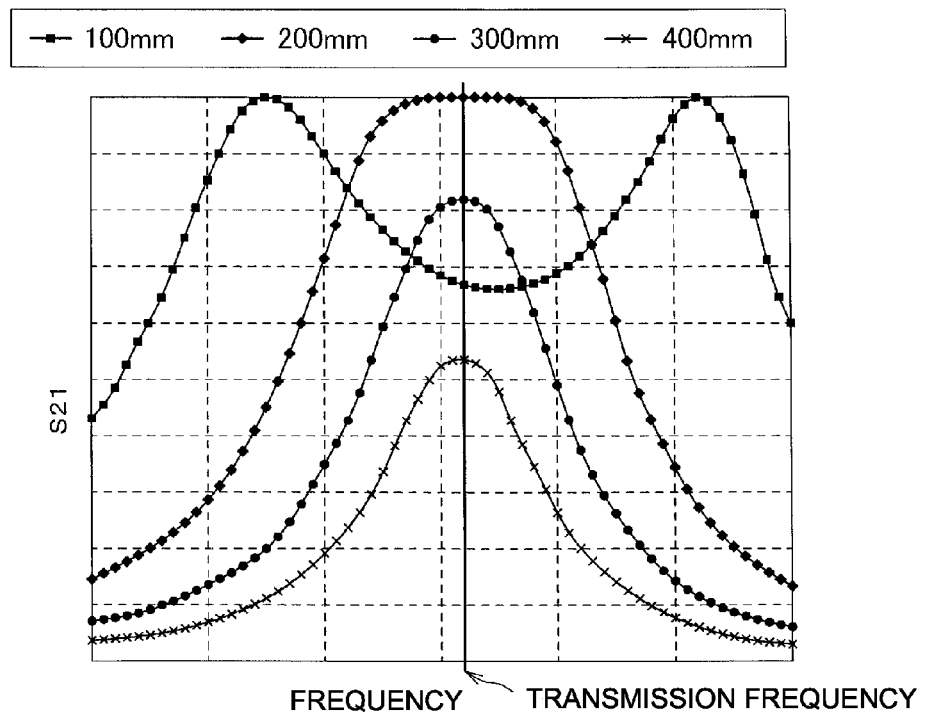
FIG. 16 is a graph indicating frequency characteristics of an S parameter S21 between resonance coils in each of cases where the inter-coil distance is set equal to 100 mm, 200 mm, 300 mm and 400 mm in a power supply system subjected to impedance adjustment to make the transmission efficiency best when the inter-coil distance is 200 mm.
Figure 17:
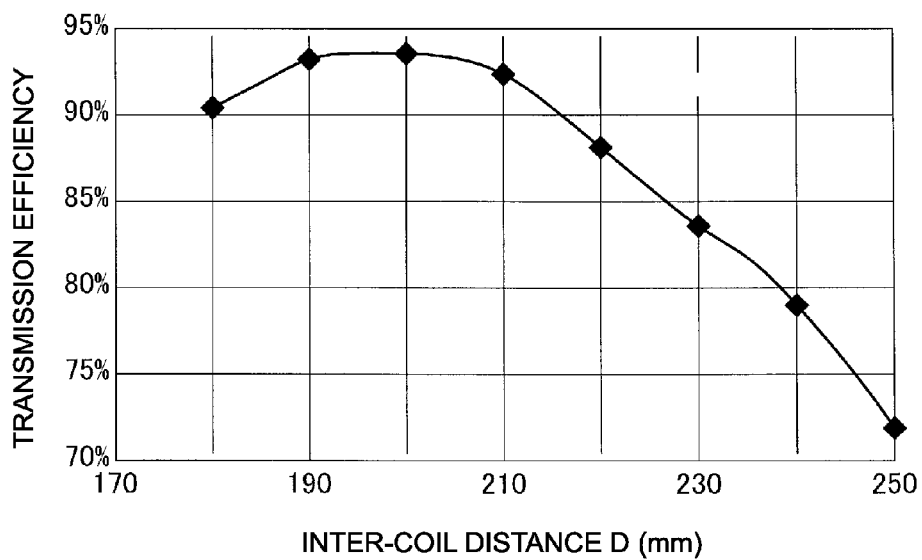
FIG. 17 is a graph indicating the transmission efficiency between resonance coils as a function of the inter-coil distance in a power supply system subjected to impedance adjustment to make the transmission efficiency best when the inter-coil distance is 200 mm.

In the above-described second embodiment and modifications thereof, the turn back portion T is provided in the primary and secondary electromagnetic induction coils 5 and 9. However, the present invention is not restricted to this. For example, as illustrated in FIG. 12, the resonance coils 6 and 7 may include coil main bodies 61 and 71, respectively and the turn back portions T. In the example illustrated in FIG. 12, the resonance coils 6 and 7 are formed in a spiral form. As illustrated in FIG. 13, the turn back portions T may be provided in resonance coils 6 and 7 having an axis disposed in the horizontal direction. As illustrated in FIG. 14, the turn back portions T may be provided in helical resonance coils 6 and 7.

It is considered that the resonant frequency of the resonance coils 6 and 7 deviates due to not only the variation of the inter-coil distance D but also variations in manufacture of the resonance coils 6 and 7, the capacitors C1 and C2, ferrite, and coil bobbins. However, it becomes possible to modify the resonant frequency by adjusting the position of the turn back portion T to adjust inductance of the resonance coils 5 and 6. As a result, impedance adjustment can be conducted.

The above-described embodiments are nothing but representative forms of the present invention. The present invention is not restricted to the embodiments. In other words, the embodiments can be modified in various ways and executed without departing from the spirit of the present invention.

REFERENCE SIGNS LIST

5 Primary electromagnetic induction coil (coil, electromagnetic induction coil)
6 Primary resonance coil (coil, resonance coil)
7 Secondary resonance coil (coil, resonance coil)
9 Secondary electromagnetic induction coil (coil, electromagnetic induction coil)
51 Coil main body
91 Coil main body
W Wedge (adjustment mechanism, mounting portion)
W1 Inclined plane
T Turn back portion (adjustment mechanism)

What is claimed is:

1. A coil serving as at least one coil among one pair of resonance coils that conduct non-contact power supply by magnetic field resonance, an electromagnetic induction coil that supplies power to a power supply side of the pair of resonance coils, or an electromagnetic induction coil supplied with power from a power receipt side of the pair of resonance coils, the coil comprising:

a coil main body; and an adjustment mechanism adjusting a number of turns of the coil main body, wherein the adjustment mechanism consists of a mounting portion including an inclined plane on which an end portion of the coil main body is mounted and which separates the end portion from other portions, and wherein the mounting portion is mounted on a holding member for holding the coil main body.

2. The coil according to claim 1, wherein the inclined plane becomes higher as a position approaches the end portion of the coil main body.

* * * * *